United States Patent
Reynolds

(10) Patent No.: US 7,453,363 B2
(45) Date of Patent: Nov. 18, 2008

(54) RFID READER SYSTEM INCORPORATING ANTENNA ORIENTATION SENSING

(75) Inventor: Matthew Stephen Reynolds, Medford, MA (US)

(73) Assignee: ThingMagic, Inc., Cambridge, MA (US)

( * ) Notice: Subject to any disclaimer, the term of this patent is extended or adjusted under 35 U.S.C. 154(b) by 85 days.

(21) Appl. No.: 11/206,914

(22) Filed: Aug. 19, 2005

(65) Prior Publication Data

US 2007/0040687 A1  Feb. 22, 2007

(51) Int. Cl.
*G08B 13/14* (2006.01)

(52) U.S. Cl. .................................. 340/572.7

(58) Field of Classification Search .............. 340/572.7, 340/572.1, 825.49, 10.1, 825.69; 235/435; 455/101; 343/757
See application file for complete search history.

(56) References Cited

U.S. PATENT DOCUMENTS

| | | | | |
|---|---|---|---|---|
| 4,131,839 | A * | 12/1978 | Springer | 318/675 |
| 6,195,007 | B1 * | 2/2001 | Takayama et al. | 340/572.1 |
| 6,335,685 | B1 * | 1/2002 | Schrott et al. | 340/572.1 |
| 6,486,832 | B1 * | 11/2002 | Abramov et al. | 343/700 MS |
| 6,819,245 | B1 * | 11/2004 | Dilling | 340/572.1 |
| 6,903,656 | B1 | 6/2005 | Lee | |
| 6,989,750 | B2 * | 1/2006 | Shanks et al. | 340/572.4 |
| 2004/0201539 | A1 | 10/2004 | Yewen | |
| 2004/0214642 | A1 | 10/2004 | Beck | |
| 2005/0231367 | A1 * | 10/2005 | Bellantoni | 340/572.1 |
| 2006/0238307 | A1 * | 10/2006 | Bauer et al. | 340/10.1 |

FOREIGN PATENT DOCUMENTS

| | | |
|---|---|---|
| WO | WO/96/22545 | 7/1996 |
| WO | WO 2004/042868 | 5/2004 |
| WO | WO2005/071790 | 8/2005 |

OTHER PUBLICATIONS

International Search Report and Written Opinion mailed Nov. 21, 2007 in International Application No. PCT/US2006/026471.
International Search Report and Written Opinion mailed May 14, 2008 in International Application No. PCT/US2006/026469.
Padhi S.K. et al: "A dual polarized aperture coupled microstrip patch antenna with high isolation for RFID applications" Jul. 8, 2001, IEEE Antennas and Propogation Society International Symposium, 2001 Digest, APS Boston, MA, Jul. 8-13, 2001 New York, NY: IEEE, US, pp. 2-5, XP010564017. ISBN: 0-7803-7070-8.

* cited by examiner

*Primary Examiner*—Phung Nguyen
(74) *Attorney, Agent, or Firm*—Davidson Berquist Jackson & Gowdey LLP

(57) ABSTRACT

An RFID (Radio Frequency Identification) reader system has a sensor system associated with its antenna system. The sensor system determines one or more of an orientation, position, velocity, motion and acceleration of antenna elements in said antenna system. The reader system uses the sensor data to control the antenna system based.

16 Claims, 9 Drawing Sheets

RFID READER SYSTEM INCORPORATING ANTENNA ORIENTATION SENSING

FIELD OF THE INVENTION

This invention relates to Radio Frequency Identification (RFID) readers.

BRIEF DESCRIPTION OF THE DRAWINGS

The invention is better understood by reading the following detailed description with reference to the accompanying drawings in which, when appropriate, like reference numerals and characters are used to designate identical, corresponding or similar components in differing drawings and in which.

BACKGROUND AND OVERVIEW

Figure 1:
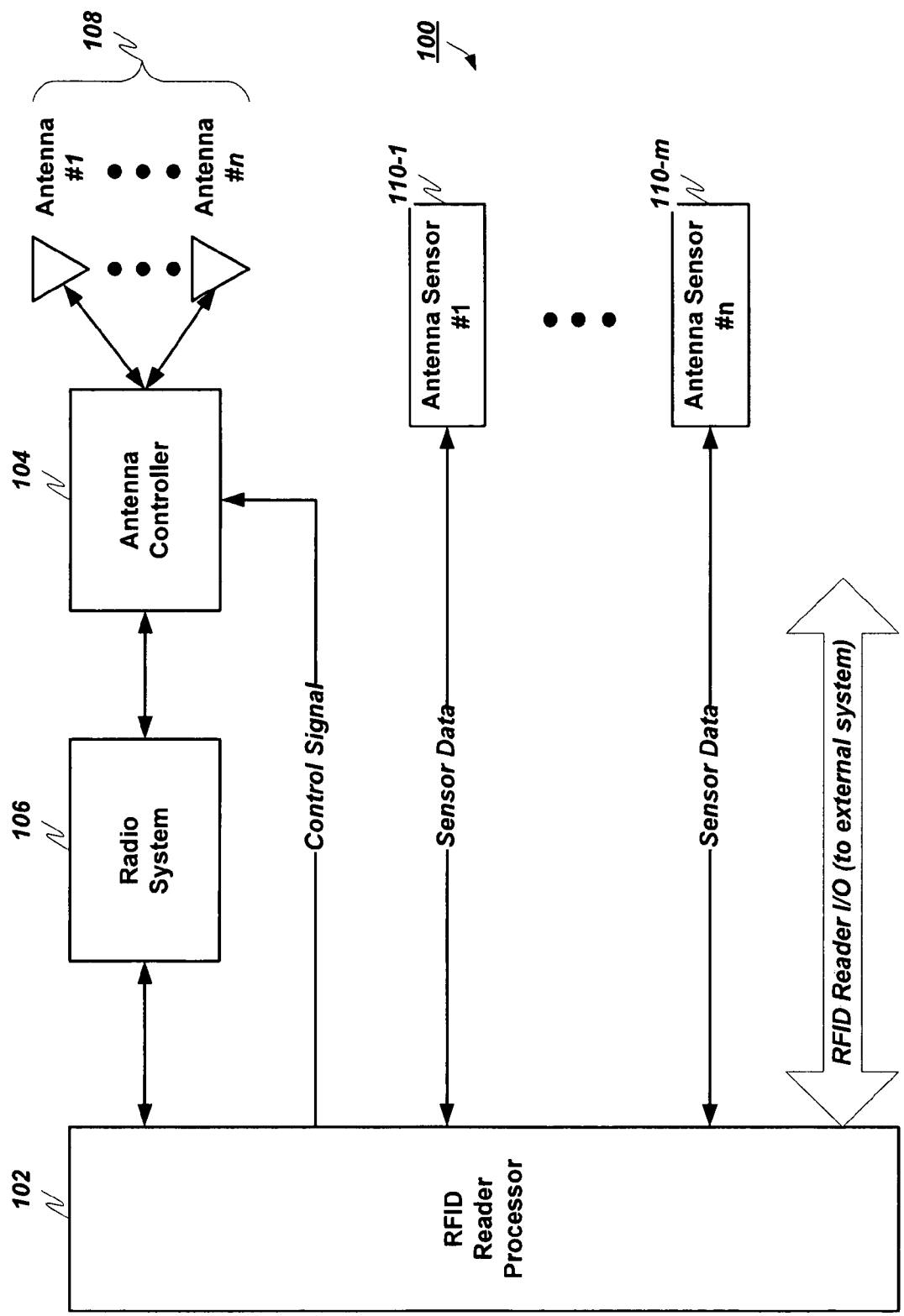
FIG. 1 is a block diagram of embodiments of the present invention.

This invention relates to RFID reader systems. More particularly, the invention relates to RFID reader systems in which the reader's antenna system may be in an unknown orientation, may be moving, or may be pointing in an unknown direction. For example, in many fixed-reader installations, a reader's antenna can be installed "right side up", "upside down", or "sideways" either at the discretion of the installer because of physical constraints such as insufficient space for mounting in a preferred orientation, or because the reader's antenna must be mounted on a moving element, such as a mechanical arm or rotating joint. In these cases, the polarization or radiation pattern of the reader's antenna may not be optimal given the polarization or spatial distribution of the tags to be read by the reader system. In situations in which it is not practical to use manual intervention to physically move the reader's antenna to a new orientation or location, it is therefore desirable for the reader's antenna system to be dynamically and automatically reconfigured.

In another aspect, this invention is particularly applicable to handheld or mobile RFID reader installations in which an RFID reader is either carried by a human, or carried by a vehicle in motion. In these cases, the physical motion of the reader's antenna system may not result in optimal reading of a particular group of tags. For example, if a handheld reader system has a linearly polarized antenna and is being used to read linearly polarized tags, the orientation of the handheld reader must be maintained in a preferred orientation (reader antenna polarization axis parallel to tag antenna polarization axis) to ensure best tag reading performance. Holding a reader in such a position may lead to repetitive stress injuries, or simply to operator fatigue over time. Alternatively, if an operator has a preferred handedness different from the one for which the handheld reader was designed, or if the operator has a disability preventing careful control over the motion of the handheld reader, the operator may have difficulty continuously pointing the reader's antenna in the proper direction for optimal tag reading. In this case too, it is desirable for the reader's antenna system to be dynamically reconfigured by an automated system.

According to presently preferred embodiments of the invention, the RFID reader system takes as input an external sensor reference for physical orientation and/or pointing direction and/or motion, and dynamically adjusts the reader's antenna system in response thereto. This dynamic adjustment may be made by means of switching antenna polarization, switching between antenna elements having different radiation patterns, or electrically steering a steered-beam antenna to a preferred direction to maintain optimal RFID reading performance.

Currently, in the case of fixed RFID readers, the reader's antenna is mounted at the time of installation in a fixed manner to a particular surface, which may be either static or moving. This antenna mounting is then not changed unless a problem with the reader system's performance is noted, and then a maintenance worker must be dispatched to readjust the antenna's mounting and once again affix it in the predetermined proper position. In the case of an RFID reader antenna mounted to a moving arm or piece of machinery, a non-optimal antenna polarization or pointing angle may well be accepted even though it results in suboptimal RFID system performance.

For handheld RFID-enabled computers, the reader's antenna is affixed in a particular orientation to the body of the handheld device, and the user is expected to move his or her hands, arms, or body appropriately to maintain a fixed orientation of the antenna with respect to a population of RFID tags being read. This often results in poor ergonomics and an awkward motion for the operator.

RFID reader systems according to embodiments of the present invention automatically compensate for the motion of the operator to allow for use of comfortable movements that do not cause repetitive strain injuries or other difficulties.

For vehicle mounted RFID readers, the motion of the vehicle is dynamically cancelled out by electrically steering either the beam polarization or radiation pattern in order to maintain optimal RFID performance.

DESCRIPTION

FIG. 1 is a block diagram of embodiments of the present invention. As shown in FIG. 1, an RFID reader system 100 includes an RFID reader processor 102 electronically connected in a known manner to an antenna controller 104 via, e.g., a radio system 106. One or more antennas (Antenna #1, . . . , Antenna #n, collectively denoted 108) may be connected to the antenna controller 104. The RFID reader operates in a known manner to read RFID tags using the antennas. An orientation, inertial, or motion sensor 110-$j$ is associated with some or all of the antennas 108. For example, sensor 110-1 may be associated with Antenna #1, sensor 110-$k$ with Antenna #r, etc. Each sensor 110-$j$ is connected to processor 102 so as to provide appropriate signals thereto. The sensors 110-$j$ may also receive signals from the processor 102.

Those skilled in the art will realize that in some cases a single sensor may be used for more than one antenna. For example, a single sensor may be used for a group of antennas that always have the same orientation (and/or position and/or velocity and/or acceleration) relative to each other. In general, in preferred embodiments, each sensor is associated with one or more antennas. If a sensor is associated with more than one antenna, by knowing the orientation (and/or position and/or velocity and/or acceleration) of one antenna, the orientations (and/or positions and/or velocities and/or accelerations) of all of the others can be determined.

The sensors should be mounted so that they record or measure movement (orientation and/or position and/or velocity and/or acceleration) in their corresponding antennas. For example, each sensor 110-j may be mounted on its corresponding antenna (or a housing thereof) or on an antenna in a group of corresponding antennas. Alternatively, a sensor may be mounted apart from an associated antenna on some structure that will move in a manner that corresponds to the movement of the associated antenna.

In some embodiments, a sensor may be or include, e.g., an accelerometer of one or more axes. An example of such as device is an ADXL low-power micromachined accelerometer series made by Analog Devices. Those skilled in the art will understand that such a device may be used as a dual-axis tilt sensor. (When the accelerometer is oriented such that both its X-axis and Y-axis are parallel to the earth's surface, it can be used as a two-axis tilt sensor with both a roll axis and a pitch axis.)

In some preferred embodiments, a sensor may be or include, e.g., an (single or dual axis) inclinometer. An exemplary inclinometer is comprised, e.g., of an electrolytic conductive fluid (such as the Spectron Spectrotilt II electrolytic inclinometer sold by Spectron Systems Technology Inc. of Hauppauge, New York) or a moving mass that either makes electrical contact (such as a mercury switch) or one that interrupts an optical path between an LED (light emitting diode) and a photodetector (such as the Omron D6B micro tilt sensor). Accelerometers may be used to determine inclination, e.g., by measuring the Earth's gravitational field, or their output may be electrically or numerically integrated to yield the velocity or position of the associated RFID reader antenna. If an inclinometer is used, the movement of the fluid or the mass inside yields a signal proportional to the inclination of the RFID reader antenna.

In some embodiments, the sensor may be or comprise a gyroscope such as, e.g., an Analog Devices ADXRS MEMS accelerometer. This type of sensor allows rotation about one or more axes are to be sensed. This rotation can be used as part of a full inertial measurement unit such as, e.g., the NAV420 inertial measurement system sold by Crossbow Technology of San Jose, Calif.

In some embodiments, the sensor may be or include a compass such as a magnetometer, Hall effect, or fluxgate compass (e.g., the Precision Navigation Vector IIX compass module). In these cases the compass heading of the RFID reader antenna is measured and the output is provided to the RFID reader system as described below.

In addition to the various sensors mentioned above, an electromagnetic indication of RFID antenna orientation or motion may be used. This may take the form, e.g., of a GPS (Global Positioning System) receiver whose antenna is col-located with the RFID reader antenna. The GPS system used may be a global, satellite-based GPS system or it may be a local system, e.g., a real-time location system (RTLS) in a warehouse. Such a local system or RTLS may be based, e.g., on the IEEE 802.11 (WiFi) standard, or it may be a proprietary system.

In some embodiments, the RFID reader itself may be used as a sensor of orientation or position, by measuring certain characteristics of the returned signal from an active or passive RFID tag mounted in a known location. In these cases, the characteristics being measured may include signal frequency, amplitude, or phase, subcarrier frequency, amplitude, or phase, or code phase. In any case, the output of the electromagnetic indication of the RFID antenna orientation or motion is input to the RFID system processor as described below.

Those skilled in the art will realize that various types of sensors may be used in combination, and that not all sensors for all antennas need be of the same type or combination of types.

Once a signal corresponding to the position and/or velocity and/or acceleration and/or orientation of the RFID reader antenna has been obtained, that signal can be processed by the RFID reader's processor. Those skilled in the art will realize that the type of processing depends, in part, on the type of sensor being used and the type of data being provided by the sensor. E.g., this processing may be as simple as determining the orientation of the RFID reader's antenna (whether the antenna is currently oriented right side up, upside down, or sideways), or it may involve determining the relative pointing angle (e.g., in X, Y, and Z axes) between the RFID reader antenna and the desired pointing location where tags may be best read.

With the antennas' positions determined, the processor 102 can signal the antenna controller 104 appropriately. E.g., the processor may signal the controller to use certain antennas and not others, or the processor may signal the controller to change the relative phase or amplitude of excitation of different antenna elements (as, e.g., in a phased array antenna) or to swap transmitting or receiving antenna elements among a group of antenna elements.

Figure 2:
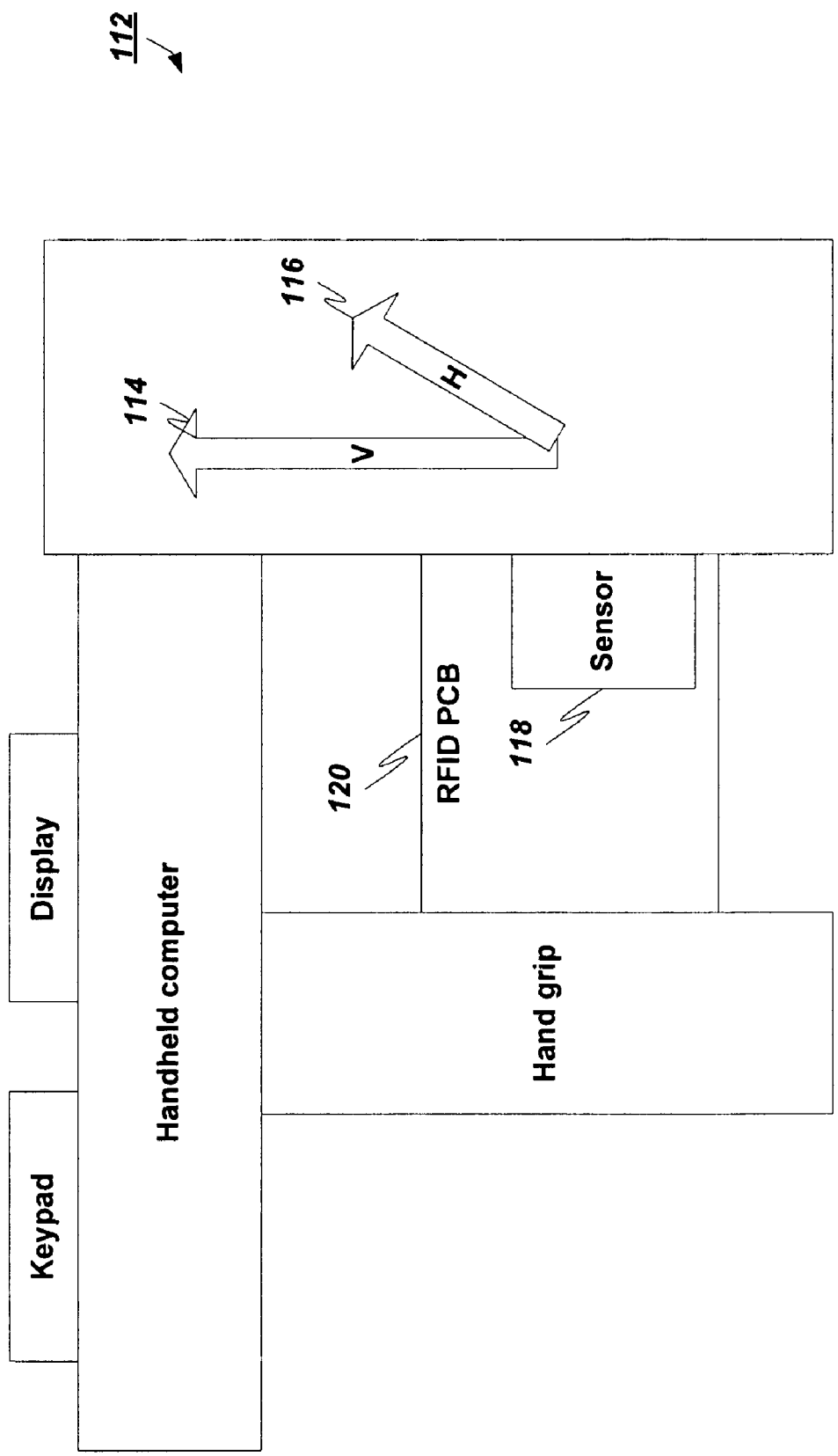
FIG. 2 depicts a handheld version of embodiments of the present invention.
Figure 3:
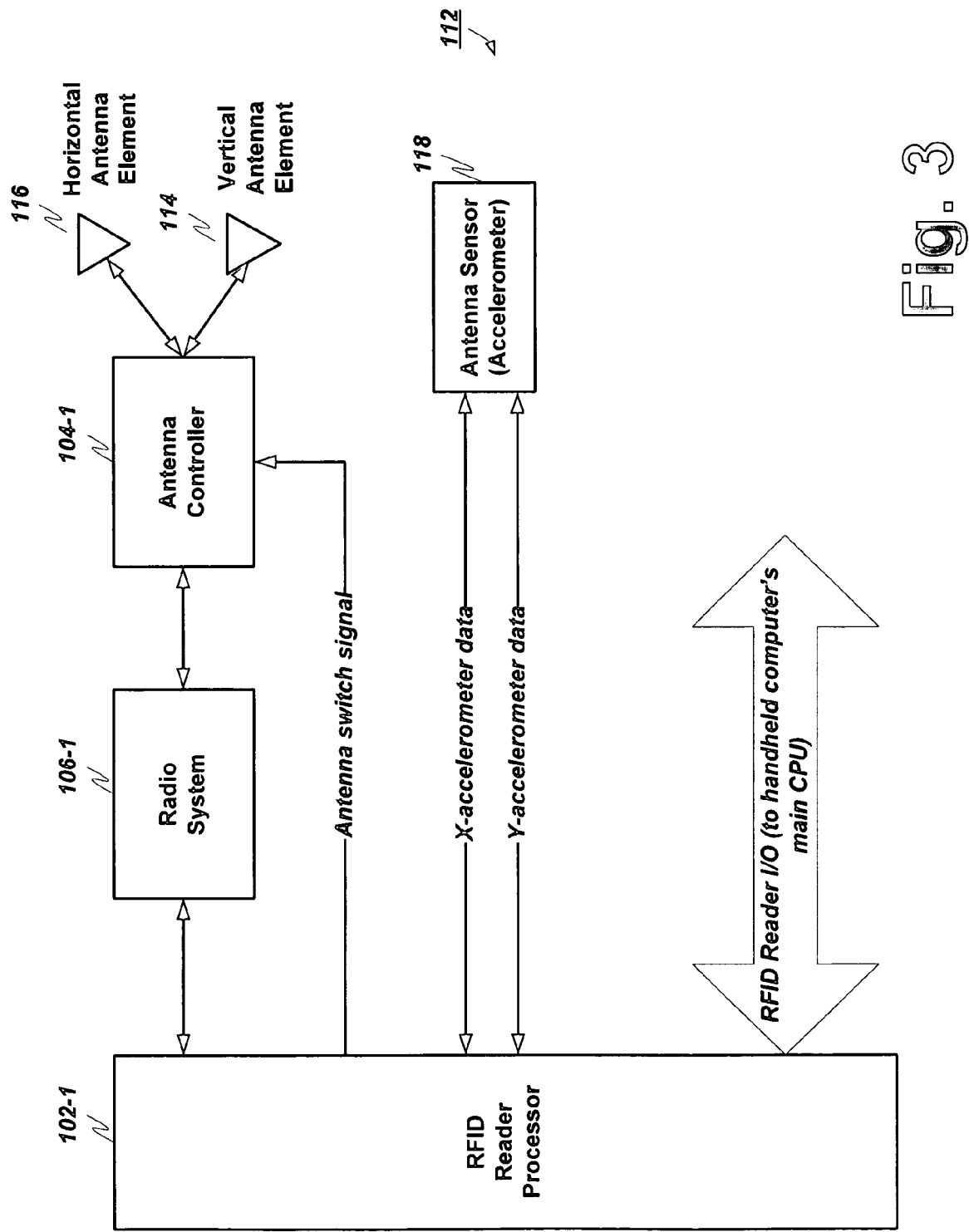
FIG. 3 is a block diagram of a handheld RFID reader according to preferred embodiments of the present invention.

In preferred embodiments of the present invention, e.g., as shown in FIGS. 2 and 3, a handheld RFID reader system 112 employs two orthogonal linearly polarized antenna elements—vertically polarized antenna element 114, and horizontally polarized antenna element 116. Thus, one of these elements (114) is oriented vertically with respect to the handheld RFID reader 112, and the other (116) is oriented horizontally with respect to the reader. The reader 112 includes an sensor 118 is mounted in a fixed and known position relative to the antenna elements 114, 116. In this manner, any change in position and/or velocity and/or acceleration and/or orientation of the antenna elements will be detected by the sensor. The sensor 118 is preferably an accelerometer (e.g., of the type Analog Devices ADXL322), and is preferably mechanically mounted on a printed circuit board (PCB) 120 containing other RFID reader circuitry, such as, e.g., the Mercury4e RFID reader module made by ThingMagic, Inc. of Cambridge, Mass. The printed circuit board 120 is, in turn, mounted parallel to the RFID reader's antenna, which is attached to the handheld RFID reader.

Figure 4:
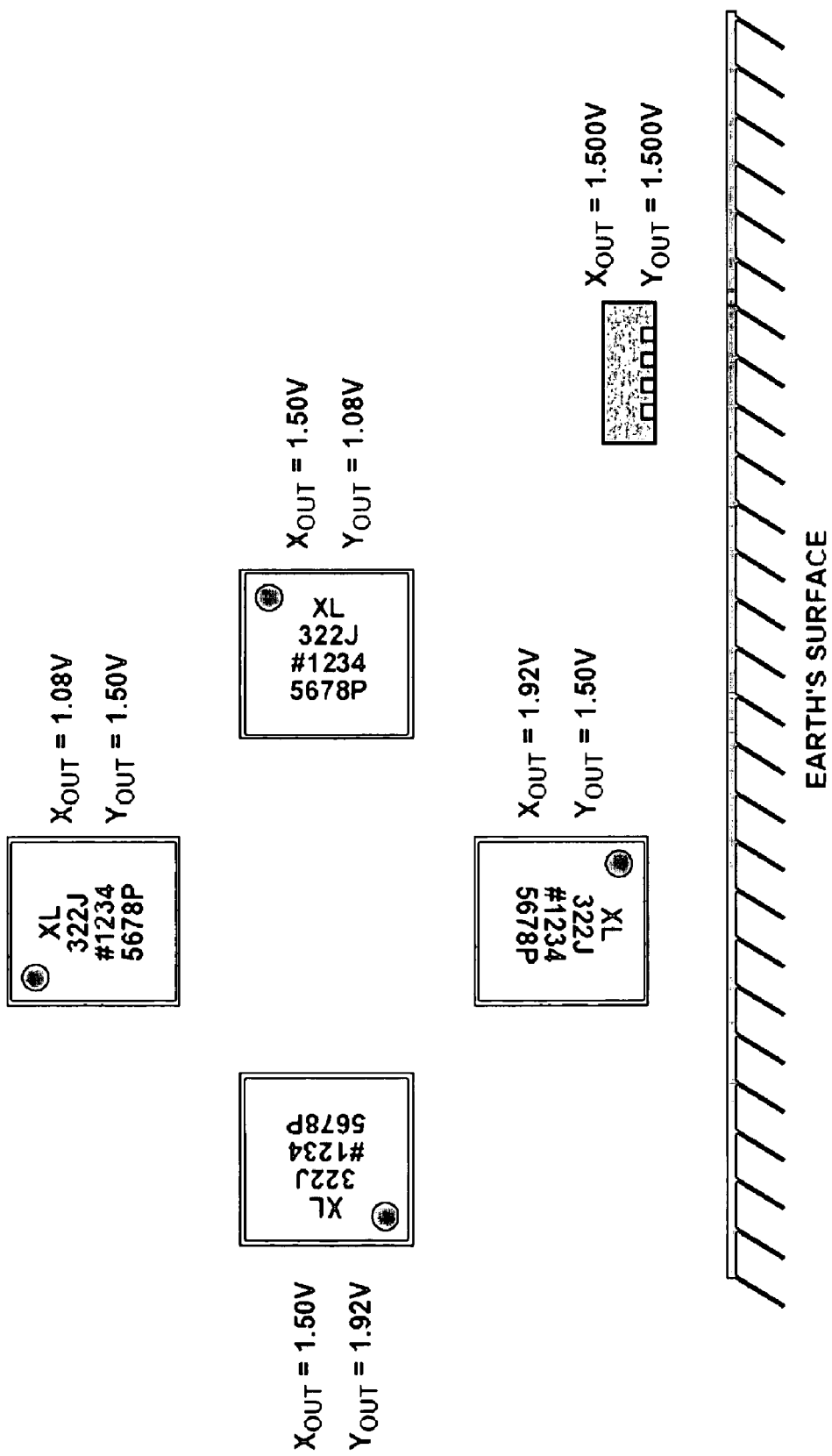
FIG. 4 shows output voltage versus orientation for an accelerometer.

As shown in FIG. 3, the output of the sensor 118—the X and Y sections of the accelerometer—are provided to the RFID reader processor 102-1 and may then be used to determine the orientation of the RFID reader's antenna elements 114, 116. This may be done, e.g., by digitizing the X and Y accelerometer voltages from the accelermometer 118 and thresholding them to yield orientation, as shown, e.g., in FIG. 4 (which shows the output response versus orientation of the ADXL322 accelermometer). For example, as can be seen from FIG. 4, when the ADXL322 accelermometer is horizontal with respect to the Earth's surface, the $X_{OUT}$ signal is 1.06 volts and the $Y_{OUT}$ signal is 1.50 volts. This digitization and processing is preferably performed by the RFID reader's processor 102-1, although it may also be performed in a separate processor or analog-to-digital converter(s), and the result communicated to the RFID reader's processor. In a presently preferred implementation, the RFID reader's processor is a Texas Instruments TMS320VC5502 DSP (digital signal processor).

Figure 5:
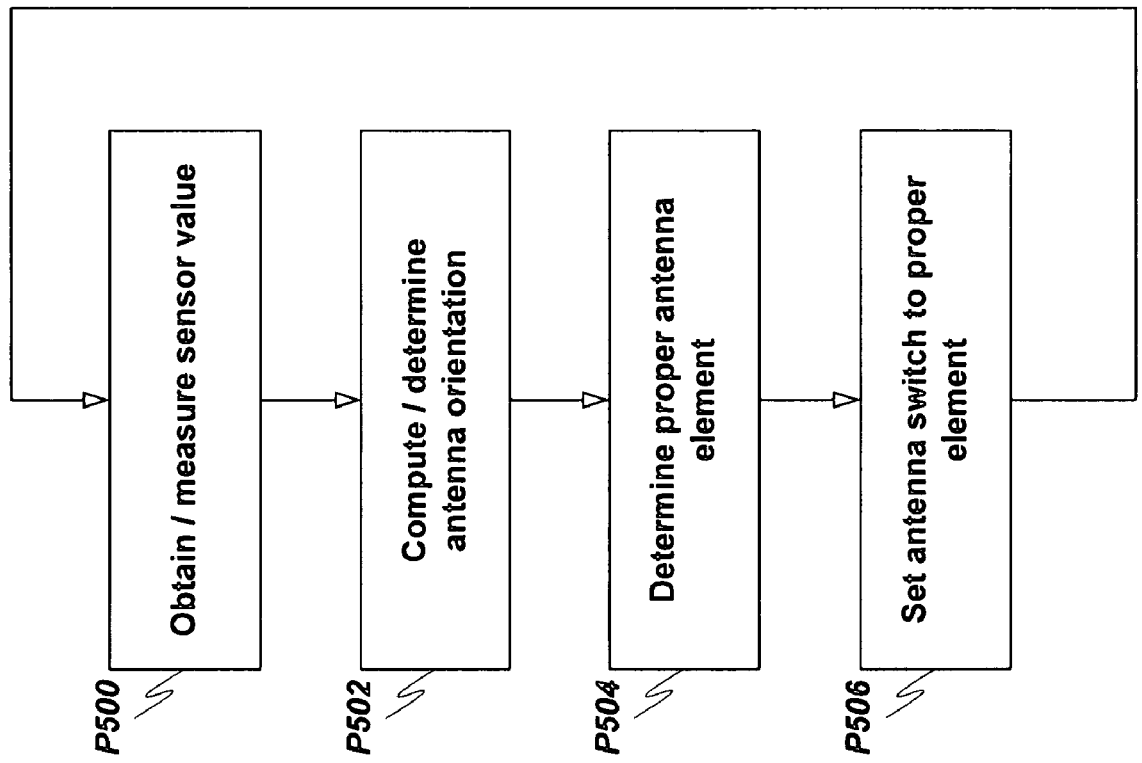
FIG. 5 is a flowchart of the operation of an RFID reader according to preferred embodiments of the present invention.

The RFID reader's orientation thus obtained, i.e., the information about whether the handheld RFID reader is oriented parallel to or perpendicular to the RFID tags, may then be used to control a switch 104-1 (e.g., an RF switch) inside the RFID reader module that switches the reader between the horizontal and vertical linearly polarized antenna elements 114, 116. This process is shown in the flowchart of FIG. 5. In a series of process steps that are repeated, the sensor's measurement values are obtained (at P500) and, based at least in part on those values, the antenna elements' orientation is determined (at P502). The determination may be performed, e.g., by comparing the measured sensor values against previously determined values for particular orientations, and basing the orientation determination on this comparison. Next the proper antenna element to use is determined (at P504), and the system is switched to use that element (at P506).

Using this embodiment, the handheld RFID reader will always transmit a signal polarized in a preferred plane, regardless of whether the user's wrist is oriented horizontally or vertically.

Figure 6:
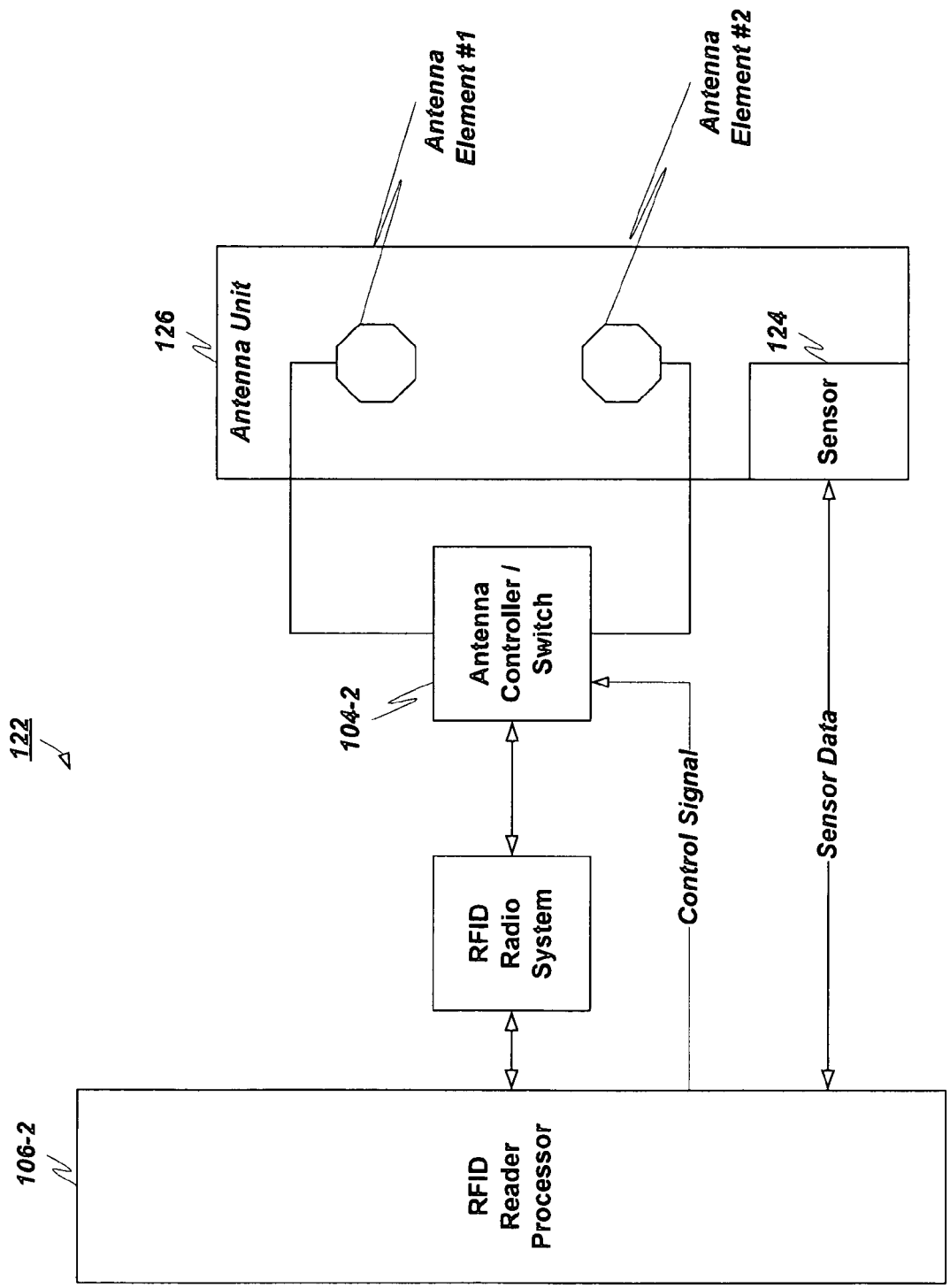
FIG. 6 is a block diagram of a fixed RFID reader according to other preferred embodiments of the present invention.

FIG. 6 is a block diagram of a fixed RFID reader 122 according to other preferred embodiments of the present invention. In these embodiments, the sensor system 124 (e.g., the accelerometer system as described above) is affixed to a fixed RFID reader antenna unit 126 containing transmit and receive elements in the same housing. (Each element may comprise more than one antenna.) This is often referred to as a bistatic RFID system. The sensor 124 enables the system to determine the orientation of the reader's antenna unit 126—i.e., whether the RFID reader antenna unit is oriented "right side up", "upside down", or "sideways"—in order to switch the RFID reader's transmit signal so that transmission always occurs from an appropriate element (the top element, bottom element, left element, or right element) as desired, thereby to assure proper RFID tag reading. As with the previous embodiments, signals from the sensor 124 are provided to the reader's processor 106-2 which can determine the antenna's orientation and adjust or switch the transmit signal accordingly (e.g., by means of control signals sent to the antenna controller/switch 104-2).

In yet other embodiments, an RFID reader antenna is mounted on a swinging/movable arm (e.g., in a factory), or on a rotating platform such as a "lazy Susan"—a revolving platform, or on a vehicle such as a forklift. In these cases, the objective is to always point the RFID reader's beam toward a particular set of tags at a certain location. To achieve this objective a magnetic compass sensor is preferably employed, along with an antenna of a steered-beam or a switchable-beam type. In the case of the switched-beam antenna, the compass heading measured by the magnetic compass is used to switch the RFID reader to the antenna element(s) most suitable for achieving the strongest signals in the direction of the RFID tags. In the case of the steered beam antenna, the offset angle between the antenna's compass heading and the desired pointing direction is calculated, and a correction signal is sent to the steered beam circuitry in order to maintain a constant pointing direction for optimal RFID tag reading.

Figure 7:
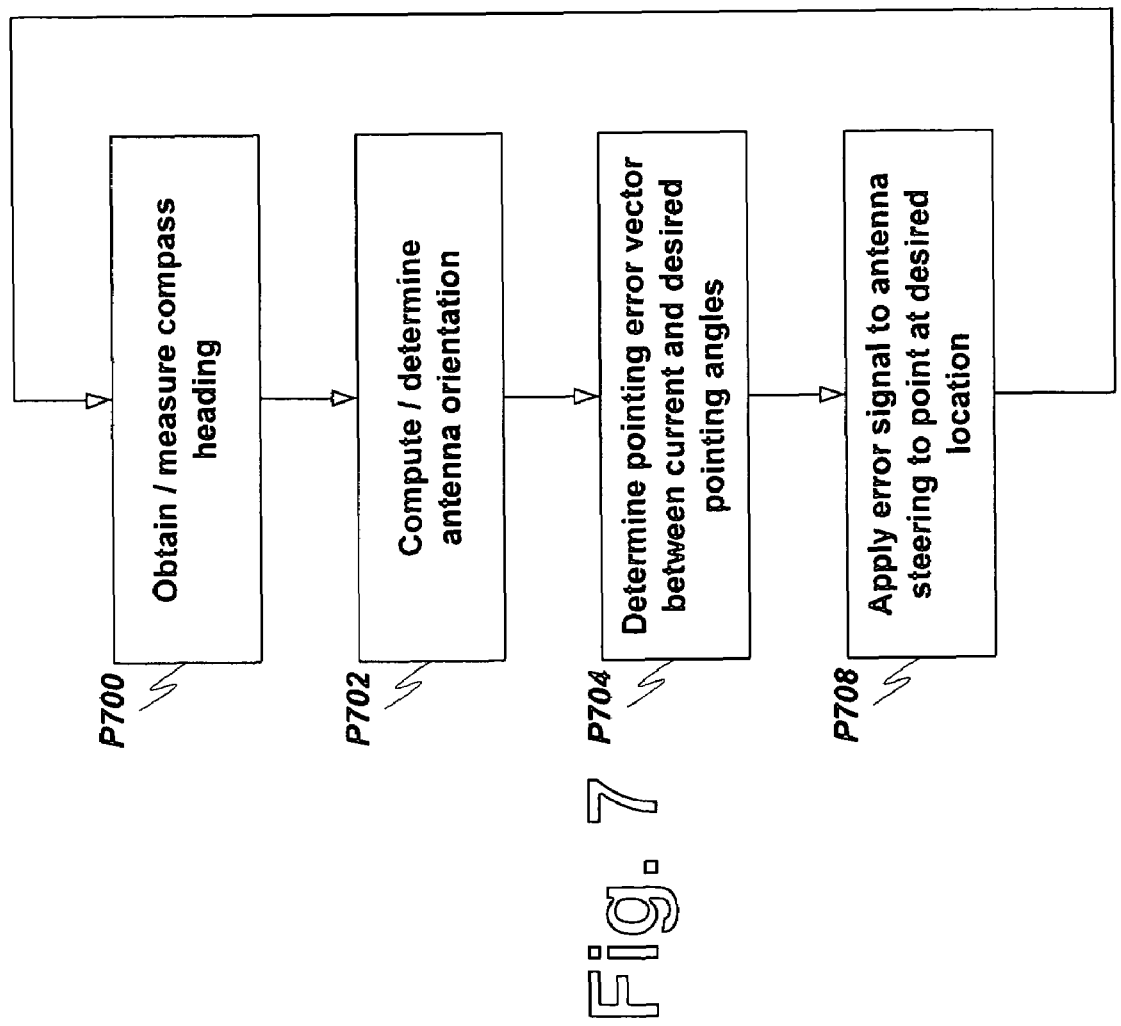
FIG. 7 is a block diagram of a fixed RFID reader according to yet other preferred embodiments of the present invention.

Operation of this system is shown in the flowchart of FIG. 7. In a series of repeated process steps, the system obtains/measures compass heading (at P700). Based at least in part on this heading, the system ascertains the antenna orientation (at P702), and determines a pointing error vector between the antenna's current and desired pointing angles (at P704). Then the system applies an appropriate signal to steer/point the antenna at the desired location (at P706).

Figure 8:
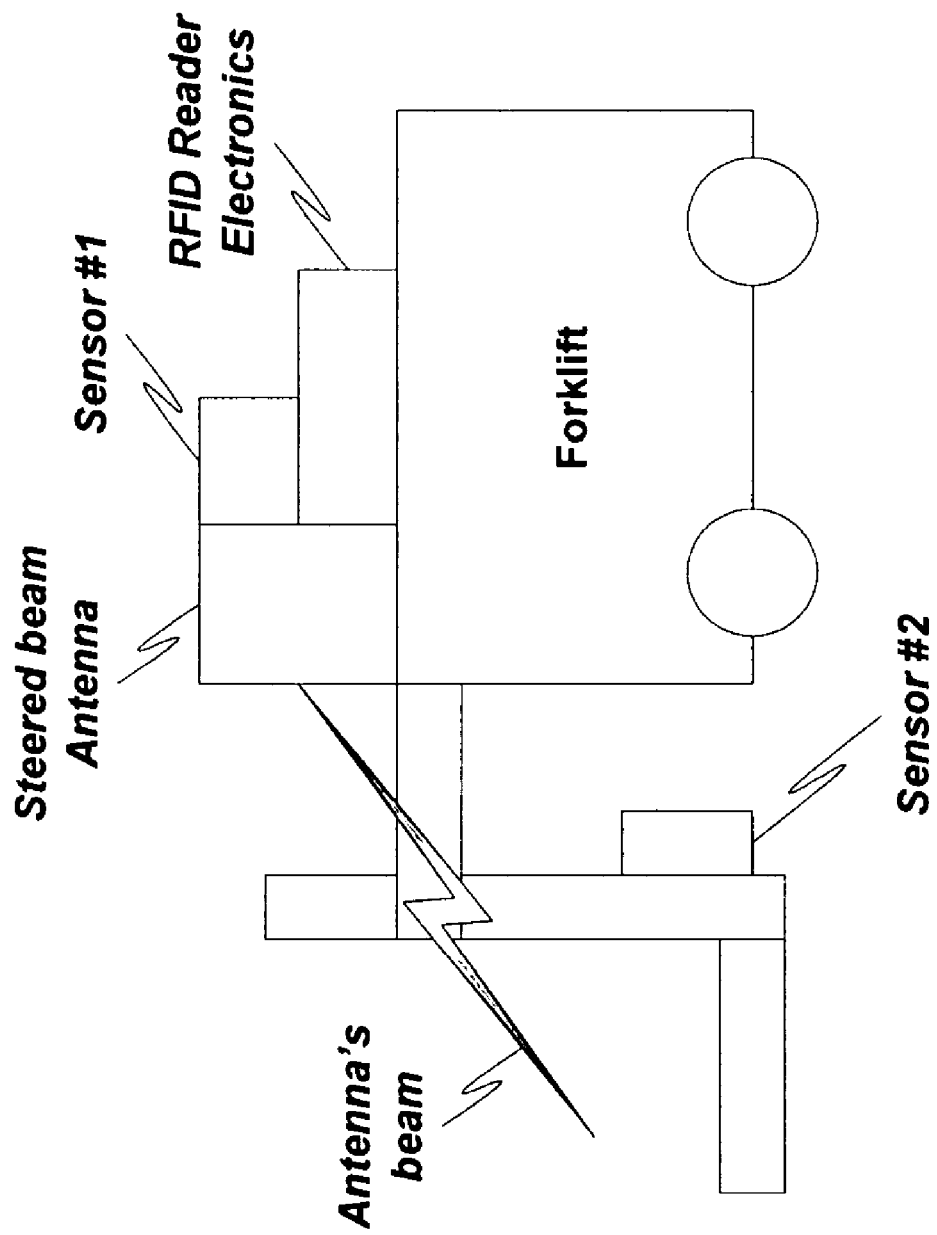
FIGS. 8-9 are flowcharts showing operation of aspects of embodiments of the present invention.
Figure 9:
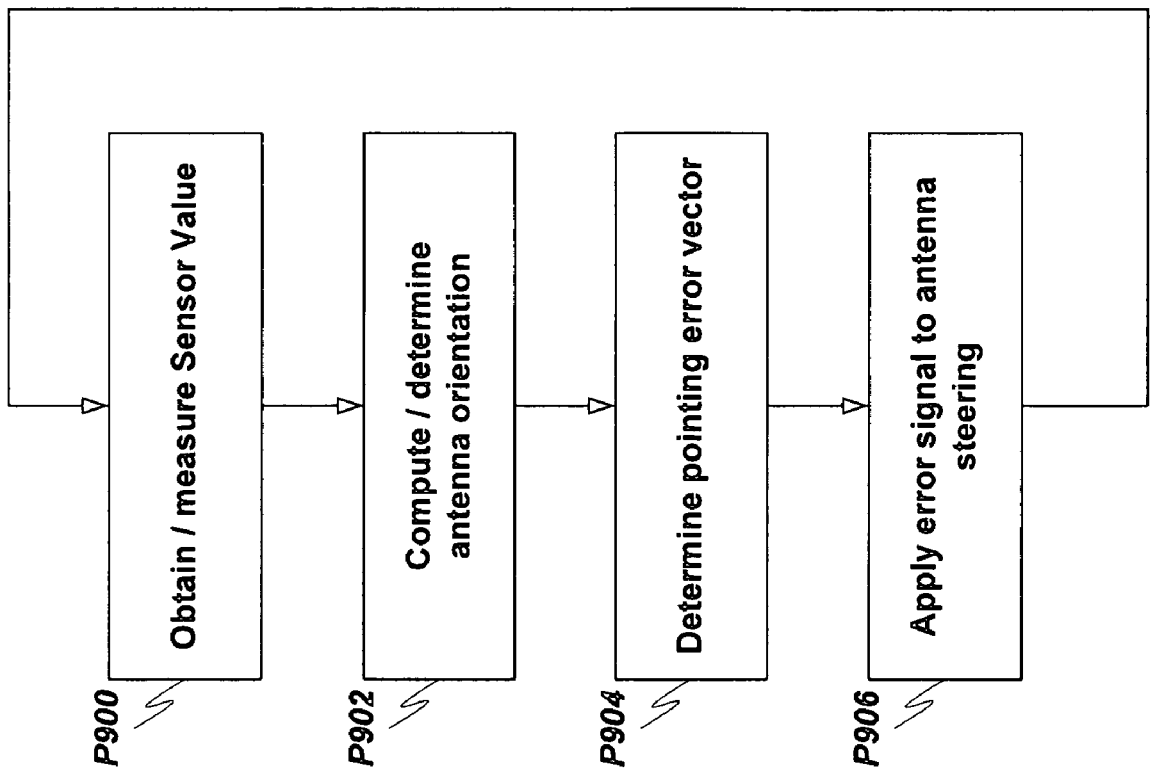

In further embodiments, e.g., as shown in FIG. 8, an RFID reader antenna is mounted on a moving vehicle or conveyance that is equipped with a receiver that can determine the reader's location (e.g., a GPS receiver), as well as, optionally, a compass sensor as described above. In these embodiments, the location—i.e., the GPS position—is used as shown in FIG. 9 to calculate an optimal pointing angle from the vehicle's position to the position of one or more RFID tags. Using either a direction of travel determined by the changing GPS position of the moving vehicle or conveyance, or the compass heading from the optional compass sensor (at P900), the angle between the RFID reader antenna and the optimal pointing angle just determined is calculated (at P902, P904). This angle is then used as an input to a steered beam antenna (at P906) such as the various types of phased array or mechanically steered beam antennas that are well known to those skilled in the art.

It should be appreciated that the particular type of sensor employed may be any of a wide variety of position, acceleration, tilt, or orientation sensors such as those mentioned herein or are otherwise known.

Furthermore, the sensor attachment to the antenna may be of any type such that the sensor moves with the antenna, even though it may not be directly attached to the antenna element itself.

Still further, the desired polarization, antenna element selection, or beam pointing angle may be determined by a wide variety of methods, including manual operator selection, database lookup either locally or via any network, by reference to a barcode, by geographic location, or by index using a "sentinel tag" placed in such a way as to indicate the desired antenna configuration for a particular application.

Those skilled in the art will realize that this invention has benefit to many different users of RFID reader systems. RFID reader systems according to this invention may be dynamically configured using a motion or orientation sensor so that they always employ the optimal antenna polarization or beam pointing direction. This will allow for the highest possible tag reading success rate.

Although the present invention has been described with reference to specific exemplary embodiments and examples, it will be evident that various modifications and changes may be made to these embodiments without departing from the broader spirit and scope of the invention as set forth in the claims. Accordingly, the specification and drawings are to be regarded in an illustrative rather than restrictive sense.

What is claimed:

1. An RFID reader system comprising:

an antenna system comprising two or more antenna elements; and a sensor system associated with the antenna system, said sensor system constructed and adapted to determine antenna data comprising one or more of an orientation, position, velocity, motion and acceleration of antenna elements in said antenna system, wherein said reader system is constructed and adapted to control said antenna system based, at least in part, on said antenna data, and wherein said reader system is constructed and adapted to select at least one of said two or more antenna elements based, at least in part, an orientation of said antenna system.

2. An RFID reader system as in claim 1 wherein said sensor system comprises one or more elements selected from the group comprising: accelerometer, inclinometer, gyroscope, and compass.

3. An RFID reader system as in claim 1 wherein said RFID reader system is in a handheld reader device and wherein said antenna elements comprise a vertically polarized antenna element and horizontally polarized antenna element, and wherein said sensor system comprises an accelerometer for determining an orientation of said reader system, and wherein said reader system is constructed and adapted to select one of said vertically polarized antenna element and said horizontally polarized antenna element based at least in part on said determined orientation.

4. An RFID reader system as in claim 1 wherein said reader system is constructed and adapted to change an orientation of an antenna element in said antenna system based at least in part on said antenna data.

5. An RFID reader system as in claim 4 wherein said reader system is on a movable device and wherein said sensor system comprises a compass for computing an orientation of the antenna element.

6. An RFID reader system as in claim 1 wherein at least a first antenna element of said antenna elements has a first polarization and at least a second antenna element of said antenna elements has a second polarization distinct from said first polarization,
and wherein said reader system is constructed and adapted to select one of said first antenna element having said first polarization and said second antenna element having said second polarization, based at least in part on said determined orientation of said antenna system.

7. A system as in claim 6 wherein
said first polarization is a vertical polarization and said first antenna element is a vertically polarized antenna element; and
said second polarization is a horizontal polarization and said second antenna element is a horizontally polarized antenna element.

8. A handheld RFID reader system comprising:
an antenna system comprising a vertically polarized antenna element and horizontally polarized antenna element; and
a sensor system associated with the antenna system, said sensor system including an accelerometer and constructed and adapted to determine an orientation of said antenna system;
wherein said reader system is constructed and adapted to select between said vertically polarized antenna element and said horizontally polarized antenna element based, at least in part, on said determined orientation of said antenna system.

9. A method comprising:
determining one or more of an orientation, position, velocity and acceleration of at least one antenna system associated with an RFID reader; and
operating said at least one antenna system based at least in part on said determining,
wherein said at least one antenna system comprises multiple antenna elements, including a first antenna element having a first polarization and a second polarized antenna element having a second polarization, said first polarization being distinct from said second polarization, and wherein the step of operating comprises:
selecting an antenna element to be used by said RFID reader,
wherein said step of selecting comprises selecting between said first antenna element and said second antenna element based at least in part on an orientation of said antenna elements.

10. A method as in claim 9 wherein said operating comprises positioning an antenna element in said antenna system based on an orientation of said antenna element.

11. A method as in claim 9 wherein
said first polarization is a vertical polarization and said first antenna element is a vertically polarized antenna element; and
said second polarization is a horizontal polarization and said second antenna element is a horizontally polarized antenna element.

12. A method of operating a handheld RFID reader the reader including an antenna system comprising a first polarized antenna element having a first polarization and a second polarized antenna element having a second polarization distinct from said first polarization, the method comprising:
determining an orientation of said reader; and
selecting an antenna element of said reader, said selecting being between said first polarized antenna element and said second polarized antenna element based at least in part, on said orientation.

13. A method as in claim 12 wherein
said first polarization is a vertical polarization and said first antenna element is a vertically polarized antenna element; and
said second polarization is a horizontal polarization and said second antenna element is a horizontally polarized antenna element.

14. An RFID reader system comprising:
an antenna system comprising one or more antenna elements; and
a sensor system associated with the antenna system, said sensor system constructed and adapted to determine antenna data comprising one or more of an orientation, position, velocity, motion and acceleration of antenna elements in said antenna system,
wherein said reader system is constructed and adapted to control said antenna system based, at least in part, on said antenna data, and
wherein said reader system is constructed and adapted to change an orientation of an antenna element in said antenna system based at least in part on said antenna data, and
wherein said reader system is on a movable device and wherein said sensor system comprises a compass for computing an orientation of the antenna element.

15. An RFID reader system in a handheld reader device, the system comprising:
an antenna system comprising two or more antenna elements; and
a sensor system associated with the antenna system, said sensor system constructed and adapted to determine antenna data comprising one or more of an orientation, position, velocity, motion and acceleration of antenna elements in said antenna system,
wherein said reader system is constructed and adapted to control said antenna system based, at least in part, on said antenna data, and
wherein said reader system is constructed and adapted to select at least one of said two or more antenna elements based, at least in part, on said antenna data, and
wherein said antenna elements comprise a vertically polarized antenna element and horizontally polarized antenna element, and wherein said sensor system comprises an accelerometer for determining an orientation of said reader system, and wherein said reader system is constructed and adapted to select one of said vertically polarized antenna element and said horizontally polarized antenna element based at least in part on said determined orientation.

16. A handheld RFID reader system comprising:

an antenna system comprising a first polarized antenna element having a first polarization and a second polarized antenna element having a second polarization distinct from said first polarization; and a sensor system associated with the antenna system, said sensor system including an accelerometer and constructed and adapted to determine an orientation of said antenna system;

wherein said reader system is constructed and adapted to select between said first polarized antenna element and said second polarized antenna element based, at least in part, on said determined orientation of said antenna system.

* * * * *